March 7, 1944.  W. J. SPARKS ET AL  2,343,816
RECOVERY OF ISO-OLEFIN POLYMERS
Filed Dec. 16, 1939
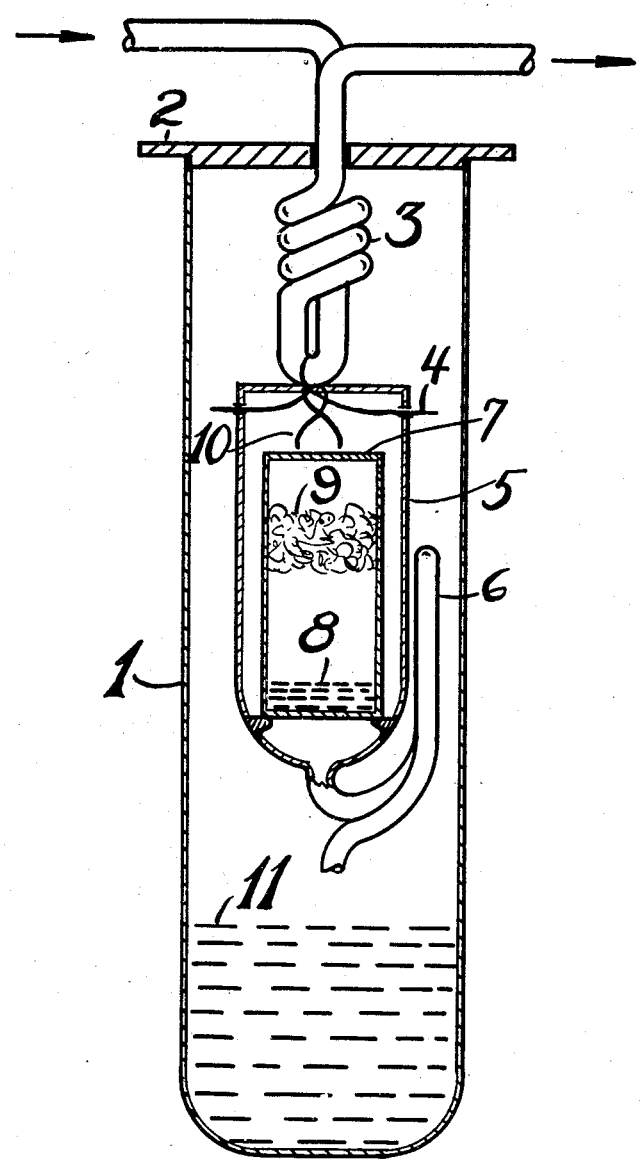
William J. Sparks
Emil L. Baldeschwieler  Inventors
Julius V. Sommer
By P. K. Young  Attorney

UNITED STATES PATENT OFFICE 2,343,816

RECOVERY OF ISO-OLEFIN POLYMERS

William J. Sparks, Alexandria, Va., and Emile L. Baldeschwieler, Cranford, and Julius V. Sommer, Elizabeth, N. J., assignors, by mesne assignments, to Jasco, Incorporated, a corporation of Louisiana Application December 16, 1939, Serial No. 309,522

1 Claim. (Cl. 260—818)

This invention is concerned with the liberation and recovery of high molecular weight iso-olefin polymers from compositions containing other rubber-like materials. More particularly, it relates to a special processing for an efficient isolation of iso-olefin polymers that permits quantitative determination of these polymers combined with rubber and other ingredients as present in vulcanized rubber compositions.

Many uses have been developed for iso-olefin polymers. They are valuable blending agents for improving motor oils, greases, asphalt, wax, and various resin compositions. Among the most interesting is their use in rubber compositions.

The success obtained in improving ageing characteristics, chemical resistance, electrical characteristics, plasticity, toughness, and other desired qualities of natural and synthetic rubbers, including diolefin polymers, polystyrene, and the like, by compounding these materials with iso-olefin polymers, typified by polybutenes, has been given widespread attention. These polymers, their preparation, and use in rubber compositions, are described in U. S. Patent 2,138,895 of December 6, 1938, to Peter J. Gaylor. As described in this patent, polymerized aliphatic iso-olefins, such as polymerized isobutylene having high molecular weights, are incorporated with rubber stocks to form improved rubber compositions which may be vulcanized and may contain various agents commonly added to rubber, for example, softening agents such as waxes or mineral oils, and fillers, such as carbon black, chalk, zinc oxide, etc.

When incorporated into the described rubber compositions, the iso-olefin polymers exhibit many extraordinary characteristics, because the resultant properties of the rubber compositions are different from those of the polymers and those of the other rubber ingredients. For example, even though the iso-olefin polymer does not appear to cure through reaction with sulfur or other vulcanizing agents commonly used for rubber, as much sulfur and accelerator may be used in vulcanizing a rubber composition in which the iso-olefin polymer is substituted for a large proportion of rubber as could be used if the iso-olefin polymers were considered to be natural rubber. This fact makes it appear that the iso-olefin polymer becomes an integral part of the rubber composition. It is to be understood that by the term rubber it is meant to designate materials consisting essentially of natural rubber, its derivatives, or synthetic polymers which are closely related in possessing similar physical and chemical properties including the capability of considerable elongation under tension and forcible retraction to substantially original size and shape upon release of tension. Rubber stocks, both synthetic and natural, may be characterized as constituting polymeric chains of hydrocarbon groups, each of these groups having at least one doubly linked pair of carbon atoms that can readily combine with reactive substances, such as sulfur or chlorine.

Although it has been found difficult to separate iso-olefin polymers from mixtures with an unvulcanized rubber by the use of ordinary solvents, it has now been determined that they can be separated simply and efficiently by extraction with certain solvents, particularly when heated, if the rubber composition containing these polymers is vulcanized or chemically modified as by methods used in reclaiming rubber.

An object of this invention is to provide an efficient method for reclaiming iso-olefin polymers used as a substitute for rubber in rubber compositions without substantial degradation of said polymers. A further object is to provide a technically useful procedure for selectively extracting iso-olefin polymer ingredients from mixtures with other hydrocarbons so that the compositions of these mixtures can be accurately analyzed and controlled with the conservation of the iso-olefin polymers.

Although methods for synthesizing the iso-olefin polymers per se are not part of this invention, and neither are the methods of using these substances to modify rubber compositions, a brief description is given herein of these methods for the sake of clarity.

Iso-olefin polymers employed for modifying rubber compositions are high molecular weight substances varying in consistency from viscous liquids to tough elastic solids and are obtained by the polymerization of isobutene at low temperatures. They range in molecular weight by the viscosity method of determination preferably from about 15,000 to about 200,000 or higher. Generically, polymers derived essentially from isobutene are called polybutenes, because in their commercial preparation, varying quantities of normal butenes may be present.

Polybutenes vary in physical properties according to their molecular weights. On the basis of penetration data, they undergo a critical transition from viscous liquids to elastic solids in the neighborhood of 27,000 molecular weight. The viscous liquid polybutenes are clear and sticky substances. The solid polybutenes having molecular weights above 27,000 are white and tough. These latter are particularly useful in structural rubber compositions.

From analytical studies and their synthesis, the polybutenes are considered to be substantially saturated linear type polymers containing a recurring branched alkene unit, viz:

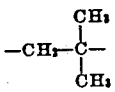

Since they have a low iodine number and a hydrogen to carbon ratio of 2.0, no more than about 1 double bond is present in each polymer molecule on an average. In a preferred mode of preparing polybutenes, isobutene is polymerized at a low temperature, for instance, below −10° C. in the presence of boron fluoride as a catalyst. To obtain the elastic solid polymers, the temperature in this type of reaction is preferably below −50° C. or even −100° C. There are other known variations of this procedure and other iso-olefin reactants, e. g. iso-amylene, which can be used to produce iso-olefin polymers having similar polyalkene structures and possess generally similar physical and chemical properties. In practice, the iso-olefin polymers, or polyalkenes as they may appropriately be called, utilized in rubber compositions are not uniformly of one molecular weight but are mixtures of polymers having different molecular weights. This makes one difficulty to contend with in separating these polymers. To further complicate the problem, other high molecular weight ingredients tenaciously combined with these polymers and bituminous materials which might be present in various amounts have, in many respects, similar physical and chemical properties. Nevertheless, a technique has been developed according to the present invention for accomplishing a very efficient and simple separation of the iso-olefin polymers.

As a general procedure, a solid rubber composition to be analyzed or from which iso-olefin polymers are to be recovered is first comminuted by mechanical treatment which does not appreciably decompose the iso-olefin polymer. A solid rubber composition is preferably cut or ground into small pieces, and preliminary to further treatments, contaminating foreign matter such as metals, cloth, paper, loosely adherent powdered materials, e. g. fillers, varnish, etc., are preferably removed by well known mechanical means, as for example, by a strainer, magnetic separator, a cyclone dust remover, etc.

Before obtaining the separation of the iso-olefin polymers by extraction from the rubber composition, the natural rubber or other rubber-like ingredients in the composition should be chemically modified and this is particularly required when the composition has not been vulcanized. In any event, a preliminary chemical disintegration aids in the separation process and this can be effected by the action of a heat treatment which may be supplemented by the action of an acidic, an alkaline, or an oxidizing agent, depending on the nature of the composition and the type of end products desired.

To an unusual degree, the iso-olefin polymers incorporated in rubber compositions have been found to resist decomposition by the action of heat and strong chemical agents used to considerably modify the rubber compositions and permit the separation of the iso-olefin polymers without substantial degradation. This fact is demonstrated by the following examples:

*Example 1*

A vulcanized rubber composition containing 32% of polybutenes, 24% natural rubber, 4% softener, and 40% inert filler was substantially insoluble in all ordinary solvents and showed only 3% acetone-soluble and 0.5% chloroform-soluble ingredients according to ordinary analytical tests of rubber employing a Soxhlet extraction apparatus. A ground sample of this vulcanized rubber composition was treated with boiling alkali solution. After separating the remaining residue from the alkali solution it was extracted with a paraffinic petroleum naphtha. The extracted polybutenes were then recovered by precipitation with methyl alcohol from the extract solution, and were determined to be 31.15% of the original sample.

*Example 2*

One g. of a finely divided vulcanized rubber composition was heated with strong nitric acid for 20 minutes. The residue freed from nitric acid was dissolved in benzene and filtered to remove insoluble material. To the clear filtrate methyl alcohol was added, and the precipitate formed was separated, dried, and weighed. The weight of the recovered precipitate was 0.3 g., showing 30% of polybutene in the sample. This determination was verified to be substantially in agreement with the amount of polybutene incorporated into the original rubber composition.

Similar results were obtained when other acids, such as hydrochloric or sulfuric acid, or even heat alone were used in treating the rubber composition.

However, it has been found that further chemical disintegration of the rubber composition is not necessary if the rubber composition has been substantially modified by vulcanization or the vulcanized composition has been subjected to a rubber reclaiming treatment and such modified compositions are subjected to a proper extraction with special solvents.

To more fully explain operations which have been found best suited for obtaining the objects of this invention, the following method, the test apparatus used in performing this method, and the results therefrom, are given exactly and in detail as follows:

The figure represents in cross-sectional elevation a view of separation apparatus used in the procedure.

In the figure, 1 indicates an extraction flask having dimensions and a shape which permits it to be later placed in a centrifuge. An open end of this flask is fitted with a cover 2 which seals the flask in operation. A cooling coil 3 is disposed at the upper end of the flask with inlets and outlets passing through cover 2. This cooling coil may be constructed of block tin. From this cooling coil is suspended by means of an aluminum wire 4 an extraction vessel 5, which is provided with a liquid trap and siphon 6 at its lower end. Resting on the bottom of the extraction vessel 5 is a porous "Alundum" thimble 7 which contains a layer of the sample to be extracted 8 at the bottom and a cover layer 9 of fine glass wool. To the cooling coil 3 an aluminum wire 10 is attached in such a manner as to cause condensate to drip into the thimble. Beneath the suspended extractor vessel is sufficient space for a pool 11 of the extract to collect.

A weighed representative sample of a prepared rubber-iso-olefin polymer composition is placed in the extractor thimble 7 and 50 cc. of a selected solvent e. g. petroleum naphtha, is placed at the bottom of the flask 1 in the position of the pool of liquid indicated by 11. The apparatus is then put into operation by sealing the cover 2 to flask 1 which is then heated in a steam bath or on a hot plate, while the cooling medium is passed through the cooling coil 3 at a sufficient rate and adjusted temperature to effectively condense and reflux vaporized solvent in the tube, causing the reflux condensate from the solvent to drip into the extractor thimble 7, from the ends of the wire 10. Extract which diffuses through the extractor thimble 7 overflows through the trap and siphon tube 6 to merge with the solvent and extract pool formed at the bottom of flask 1. This operation is carried out for a period of two hours, in which time the solvent will extract all the iso-olefin polymer present and in addition may extract free sulfur, rubber-resins, waxes, mineral oils, and some slight amount of unvulcanized rubber, if present in the original sample. The apparatus is then disconnected and a proper amount of a precipitating agent such as chemically pure acetone is added slowly to the naphtha solution in the tube while the tube is whirled continuously. By adding 25 cc. of the acetone which amounts to 50% by volume of the extract or 33⅓ by volume of the total blend, the iso-olefin polymer is precipitated leaving the other components in solution. The precipitated polybutene appears as a white flocculent precipitate, which is collected into a solid sticky mass by whirling the tube containing the solution and the precipitate at 1800 R. P. M. in a centrifuge. Then, if upon addition of more acetone to a supernatant liquid, the solution remains absolutely clear with no further precipitation, the liquid can be decanted from the polybutene precipitate.

The separated polybutene may still contain some occluded impurities and for more accurate determination should be purified by redissolving in 15 cc. chemically pure benzene then reprecipitated by the addition of 10 cc. of acetone, followed by repetition of centrifuging to collect the polybutene precipitate so that the excess solvent can be decanted.

Finally, the separated and purified polybutene mass is freed from adhering solvent by inserting the tube in a steam bath and blowing a gentle stream of air over the polymer.

When the odor of the solvent has disappeared, the polybutene is dried for two hours at 105° C., then weighed, and the percentage content of the polybutene in the original mixture is calculated.

The modes of separation described are based mainly on the practically complete insolubility of natural and synthetic rubber ingredients in extracting agents for iso-olefin polymers after a rubber composition containing these ingredients has been chemically modified to make the iso-olefin polymers extractable by their solvents. To obtain a maximum isolation of the iso-olefin polymers from other ingredients, the method of separation involves the addition of oxygenated aliphatic liquids to the extract solution in proportions which make all components of the extract except the iso-olefin polymers form a homogeneous liquid phase with the extracting solvent and selectively precipitate the iso-olefin polymers.

Satisfactory results are best obtained when the rubber composition is extracted at a temperature above about 100° F. but preferably not higher than about 600° F. The extraction procedure is also improved in efficiency when the extracting solvent is supplied in a continuous stream or in successive portions to the rubber composition and the extract withdrawn similarly. The procedure for recovering the iso-olefin polymers from the extract solution may be varied depending upon whether it is desired to recover the total extracted material, to isolate the total amount of polymer from the extract or to recover only polymers of a certain molecular weight range.

The total extract may be recovered from the extract solution by evaporating the solvent, but to segregate all or certain of the iso-olefin polymers from other extracted ingredients, definite proportions of a precipitating agent are added to the extract solution in the manner described. For the more accurate and complete isolation of the iso-olefin polymers, it is important to avoid using amounts of the precipitating agent above certain limits since such an excess of the precipitating agent causes separation of the extract solution into two liquid layers. Below a lower limit, the precipitating agent will cause incomplete precipitation of the iso-olefin polymer. For a safe lower limit in the analytical separation of the iso-olefin polymers at ordinary temperatures, the ratio of the precipitating agent to the extracting solvent should be 1 to 7 parts by volume. The upper limiting ratio of precipitating agent to extracting solvent may be 1:2 or 1:3 depending upon the quantity of high molecular weight hydrocarbon materials present, such as mineral oil bright stock. Proper amounts of the precipitating agent may be added to the extract solution if added in small proportions with separation of precipitate formed until finally the extract solution separates into two liquid layers.

Since, in general, the iso-olefin polymers are readily extracted by the volatile liquid hydrocarbons, any of these may be used in the same procedure. Among such solvents may be mentioned paraffinic solvents, such as straight run gasoline, naphthas, pentane, hexane, octane, and kerosene; aromatic and hydroaromatic solvents, such as benzol, toluol, xylol, and cyclohexane; or mixtures of these various substances. Chlorinated solvents which may be used are carbon tetrachloride, ethylene dichloride, tetrachlorethane, chloroform, and the like. Other known solvents for hydrocarbons may also be employed, e. g. carbon disulfide, but preferably solvents of paraffinic constitution are used.

Although the iso-olefin polymers are quite soluble in the classes of solvents for hydrocarbon materials which have been mentioned, considerable thickening of the solvent results from their blends and for this reason, and for the advantage of solvent recovery by volatilization, solvents of low viscosity and low boiling ranges are preferred to more viscous and higher boiling ones.

The precipitants in addition to acetone may be other aliphatic oxygen-containing liquids of low molecular weight. Of this broad class the alcohols are a narrower group and of these, ethyl, methyl, propyl, butyl, and amyl alcohols or mixtures of these are eminently satisfactory. Various other ketones may also be used and among these may be mentioned acetone, methyl ethyl, and diethyl ketone. Other low molecular weight oxygen-containing aliphatic compounds may be used, such as ethers, aldehydes, acids, and esters, but they are somewhat inferior to solvents of the alcohol and ketone types and, therefore, would have to be employed in repeated steps.

A series of tests were made on the isolation of polybutenes from a vulcanized rubber composition containing certain proportions of rubber, polybutenes, a softener, and inert material. Typical results from these tests are shown in the following table:

| Per cent polybutenes compounded in vulcanizates | Solvent | Precipitating agent | Per cent polybutene recovered |
|---|---|---|---|
| 14.0 | Naphtha | Methyl alcohol | 14.96 |
| | do | Acetone | 14.50 |
| | n-Heptane | do | 13.92 |
| | Methylcyclohexane | do | 14.85 |
| | Chloroform | do | 13.83 |
| 22.0 | Naphtha | Methyl alcohol | 22.73 |
| | n-Heptane | Acetone | 22.54 |
| 32.0 | Naphtha | Methyl alcohol | 31.58 |
| | Chloroform | Acetone | 30.88 |
| 48.0 | Naphtha | Methyl alcohol | 48.74 |
| | do | do | 44.56 |
| | do | Acetone | 46.5 |
| | n-Heptane | do | 43.57 |
| | Chloroform | do | 46.77 |

It can be readily observed from the foregoing tabulated data that the iso-olefin polymer is recovered in quantitative amounts which agree with the amounts of the polymer incorporated into the rubber composition. While these results demonstrate the effectiveness of the procedure for thoroughly isolating the iso-olefin polymers, it should be understood that in the practical application for the recovery of these polymers, it may be desirable to segregate only fractional quantities or to recover them together with other extracted ingredients such as waxes, mineral oil softeners, or other bituminous materials. Various other treatments may be used for purifying the iso-olefin polymers either before or after separation from the rubber composition. Such methods may involve the treatment with sulfuric acid, ozone, clay, caustic soda, washing with water, distilling, etc. After being recovered, the iso-olefin polymers are suitable for reuse in new rubber compositions or other types of compositions for which such polymers have been found adapted.

It is not intended that the invention be limited by any of the specific examples, but only by the appended claims in which it is intended to claim all inherent novelty as broadly as the prior art permits.

We claim:

A process for isolating and recovering pure isobutylene polymers of high molecular weight from a vulcanized composition of said polymers and natural rubber, which comprises extracting said polymers with naphtha hydrocarbons at temperatures within the range of about 100° F. to 600° F., separating a clear homogeneous solution of said polymers in the naphtha hydrocarbons from an undissolved portion of said vulcanized composition, adding to said solution methyl alcohol in a proportion to precipitate the polymers therefrom while maintaining the remainder of said solution containing the added methyl alcohol in a single liquid phase, and separating the polymers thus precipitated from said solution.

WILLIAM J. SPARKS.
EMILE L. BALDESCHWIELER.
JULIUS V. SOMMER.